United States Patent
Imai

(10) Patent No.: US 10,546,693 B2
(45) Date of Patent: Jan. 28, 2020

(54) MULTILAYER CERAMIC CAPACITOR

(71) Applicant: TAIYO YUDEN CO., LTD., Chuo-ku, Tokyo (JP)

(72) Inventor: Atsushi Imai, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 45 days.

(21) Appl. No.: 16/011,275

(22) Filed: Jun. 18, 2018

(65) Prior Publication Data

US 2018/0374645 A1 Dec. 27, 2018

(30) Foreign Application Priority Data

Jun. 26, 2017 (JP) .................. 2017-123910

(51) Int. Cl.
*H01G 4/30* (2006.01)
*H01G 4/012* (2006.01)
*H01G 4/38* (2006.01)
*H01G 4/248* (2006.01)
*H01G 4/232* (2006.01)
*H01G 4/12* (2006.01)

(52) U.S. Cl.
CPC .............. *H01G 4/30* (2013.01); *H01G 4/012* (2013.01); *H01G 4/248* (2013.01); *H01G 4/385* (2013.01); *H01G 4/12* (2013.01); *H01G 4/232* (2013.01)

(58) Field of Classification Search
CPC ...... H01G 4/1209; H01G 4/005; H01G 4/302; H01G 4/306; H01G 4/30; H01G 4/012; H01G 4/248; H01G 4/385; H01G 4/12; H01G 4/232; C23C 14/34
USPC ............................................ 361/306.3, 301.4
See application file for complete search history.

(56) References Cited

U.S. PATENT DOCUMENTS

2018/0166217 A1* 6/2018 Kato .................. H01G 4/12
2018/0174757 A1* 6/2018 Kim .................. H01G 4/232

FOREIGN PATENT DOCUMENTS

JP 2000243657 A 9/2000

* cited by examiner

*Primary Examiner* — Michael P McFadden
(74) *Attorney, Agent, or Firm* — Law Office of Katsuhiro Arai

(57) ABSTRACT

In an embodiment, a multilayer ceramic capacitor 10 is constituted in such a way that its capacitor body 11 houses a capacitance part which is halved in the third direction d3, along a shared internal electrode layer 11a3 serving as a boundary, into a high-capacitance part HC and a low-capacitance part LC. When the capacitor body 11 is cut along a surface crossing at right angles with the first direction d1, the revealed cross-sectional shape of the shared internal electrode layer 11a3 has a cross-sectional shape where a curved part CP that projects toward the dielectric layer 11b2 on low-capacitance part LC side adjoining the shared internal electrode layer 11a3, is present on both sides in the second direction d2, and also in between.

10 Claims, 3 Drawing Sheets

|          | D2[CP] | D3[CP] | D2[CP] | D3[CP] | D2[CP] | D3[CP] | Separation |
|----------|--------|--------|--------|--------|--------|--------|------------|
| Sample01 | ------ | ------ | ------ | ------ | ------ | ------ | 9/10       |
| Sample02 | 130μm  | 1μm    | 130μm  | 1μm    | 130μm  | 1μm    | 2/10       |
| Sample03 | 130μm  | 2μm    | 130μm  | 2μm    | 130μm  | 2μm    | 2/10       |
| Sample04 | 130μm  | 4μm    | 130μm  | 4μm    | 130μm  | 4μm    | 0/10       |
| Sample05 | 130μm  | 6μm    | 130μm  | 6μm    | 130μm  | 6μm    | 0/10       |
| Sample06 | 130μm  | 8μm    | 130μm  | 8μm    | 130μm  | 8μm    | 0/10       |
| Sample07 | 130μm  | 10μm   | 130μm  | 10μm   | 130μm  | 10μm   | 0/10       |
| Sample08 | 130μm  | 15μm   | 130μm  | 15μm   | 130μm  | 15μm   | 0/10       |
| Sample09 | 130μm  | 15μm   | 130μm  | 10μm   | 130μm  | 15μm   | 0/10       |
| Sample10 | 130μm  | 2μm    | 130μm  | 1μm    | 130μm  | 2μm    | 1/10       |
| Sample11 | 160μm  | 6μm    | 70μm   | 4μm    | 160μm  | 8μm    | 0/10       |
| Sample12 | 70μm   | 1μm    | 170μm  | 1μm    | 150μm  | 1μm    | 2/10       |

|          | D2[CP] | D3[CP] | D2[FP] | D2[CP] | D3[CP] | D2[FP] | D2[CP] | D3[CP] | Separation |
|----------|--------|--------|--------|--------|--------|--------|--------|--------|------------|
| Sample13 | ------ | ------ | ------ | ------ | ------ | ------ | ------ | ------ | 9/10       |
| Sample14 | 90μm   | 1μm    | 60μm   | 90μm   | 1μm    | 60μm   | 90μm   | 1μm    | 2/10       |
| Sample15 | 90μm   | 2μm    | 60μm   | 90μm   | 2μm    | 60μm   | 90μm   | 2μm    | 2/10       |
| Sample16 | 90μm   | 4μm    | 60μm   | 90μm   | 4μm    | 60μm   | 90μm   | 4μm    | 0/10       |
| Sample17 | 90μm   | 6μm    | 60μm   | 90μm   | 6μm    | 60μm   | 90μm   | 6μm    | 0/10       |
| Sample18 | 90μm   | 8μm    | 60μm   | 90μm   | 8μm    | 60μm   | 90μm   | 8μm    | 0/10       |
| Sample19 | 90μm   | 10μm   | 60μm   | 90μm   | 10μm   | 60μm   | 90μm   | 10μm   | 0/10       |
| Sample20 | 90μm   | 15μm   | 60μm   | 90μm   | 15μm   | 60μm   | 90μm   | 15μm   | 0/10       |
| Sample21 | 90μm   | 15μm   | 60μm   | 90μm   | 10μm   | 60μm   | 90μm   | 15μm   | 0/10       |
| Sample22 | 90μm   | 2μm    | 60μm   | 90μm   | 1μm    | 60μm   | 90μm   | 2μm    | 1/10       |
| Sample23 | 110μm  | 6μm    | 60μm   | 50μm   | 4μm    | 60μm   | 110μm  | 11μm   | 0/10       |
| Sample24 | 30μm   | 1μm    | 80μm   | 130μm  | 1μm    | 80μm   | 70μm   | 1μm    | 2/10       |

|          | D2[CP] | D3[CP] | D2[FP] | D2[CP] | D3[CP] | Separation |
|----------|--------|--------|--------|--------|--------|------------|
| Sample25 | ------ | ------ | ------ | ------ | ------ | 9/10       |
| Sample26 | 130μm  | 1μm    | 130μm  | 130μm  | 1μm    | 2/10       |
| Sample27 | 130μm  | 2μm    | 130μm  | 130μm  | 2μm    | 2/10       |
| Sample28 | 130μm  | 4μm    | 130μm  | 130μm  | 4μm    | 1/10       |
| Sample29 | 130μm  | 6μm    | 130μm  | 130μm  | 6μm    | 1/10       |
| Sample30 | 130μm  | 8μm    | 130μm  | 130μm  | 8μm    | 1/10       |
| Sample31 | 130μm  | 10μm   | 130μm  | 130μm  | 10μm   | 1/10       |
| Sample32 | 130μm  | 15μm   | 130μm  | 130μm  | 20μm   | 1/10       |
| Sample33 | 130μm  | 15μm   | 130μm  | 130μm  | 10μm   | 1/10       |
| Sample34 | 130μm  | 1μm    | 130μm  | 130μm  | 1.5μm  | 2/10       |
| Sample35 | 160μm  | 1μm    | 70μm   | 160μm  | 1μm    | 2/10       |
| Sample36 | 100μm  | 1μm    | 200μm  | 90μm   | 1μm    | 2/10       |

MULTILAYER CERAMIC CAPACITOR

BACKGROUND

Field of the Invention

The present invention relates to a multilayer ceramic capacitor.

Description of the Related Art

Patent Literature 1 cited below (refer to FIGS. 2 and 6 thereof, in particular) discloses a multilayer ceramic capacitor comprising a capacitor body of roughly rectangular solid shape that has a capacitance part constituted by multiple internal electrode layers stacked together with dielectric layers in between, and a pair of external electrodes to which the multiple internal electrode layers are connected alternately, wherein the capacitance part is halved in the stacking direction, along a shared internal electrode layer serving as a boundary, into a high-capacitance part and a low-capacitance part. The relationship of "Capacitance of the high-capacitance part>Capacitance of the low-capacitance part" is satisfied by the relationship of "Thickness of each dielectric layer constituting the high-capacitance part<Thickness of each dielectric layer constituting the low-capacitance part."

It should be noted that, while the aforementioned multilayer ceramic capacitor requires that an unsintered capacitor body be sintered during the course of manufacturing, there is a concern that, in the sintering process, the shared internal electrode layer and the dielectric layer on the low-capacitance part side adjoining the shared internal electrode layer may separate from each other because of the relationship of "Thickness of the dielectric layer on the high-capacitance part side adjoining the shared internal electrode layer<Thickness of the dielectric layer on the low-capacitance part side adjoining the shared internal electrode layer," and that this separation may exist in the capacitor body.

BACKGROUND ART LITERATURES

[Patent Literature 1] Japanese Patent Laid-open No. 2000-243657

SUMMARY

An object of the present invention is to provide a multilayer ceramic capacitor wherein a separation does not develop easily between the shared internal electrode layer and the dielectric layer on the low-capacitance part side adjoining the shared internal electrode layer, even when there is a relationship of "Thickness of the dielectric layer on the high-capacitance part side adjoining the shared internal electrode layer<Thickness of the dielectric layer on the low-capacitance part side adjoining the shared internal electrode layer."

Any discussion of problems and solutions involved in the related art has been included in this disclosure solely for the purposes of providing a context for the present invention, and should not be taken as an admission that any or all of the discussion were known at the time the invention was made.

To achieve the aforementioned object, the multilayer ceramic capacitor pertaining to the present invention is a multilayer ceramic capacitor, comprising: a capacitor body of roughly rectangular solid shape that has a capacitance part constituted by multiple internal electrode layers stacked together with dielectric layers in between; and a pair of external electrodes to which the multiple internal electrode layers are connected alternately; wherein, when the direction in which two opposing faces of the capacitor body face each other (direction in which the external electrodes face each other) is defined as the first direction, the direction in which other two opposing faces face each other is defined as the second direction, and the direction in which the remaining two opposing faces face each other (direction in which the internal electrode layers are stacked) is defined as the third direction, and the dimensions along the respective directions are defined as the first-direction dimension, the second-direction dimension, and the third-direction dimension, respectively, then the capacitance part is halved in the third direction, along a shared internal electrode layer serving as a boundary, into a high-capacitance part and a low-capacitance part, where there is a relationship of "Capacitance of the high-capacitance part>Capacitance of the low-capacitance part"; and when the capacitor body is cut along a randomly selected surface crossing at right angles with the first direction, the revealed cross-sectional shape of the shared internal electrode layer has a curved part that projects toward the dielectric layer on the low-capacitance part side adjoining the shared internal electrode layer, in at least two locations (i.e., the thickness of an adjoining dielectric layer on the high-capacitance part side is greater in the at least two locations than the thickness of the dielectric layer in other locations and/or the thickness of other dielectric layers on the high-capacitance part side).

According to the multilayer ceramic capacitor pertaining to the present invention, a separation does not develop easily between the shared internal electrode layer and the dielectric layer on the low-capacitance part side adjoining the shared internal electrode layer.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

FIG. 5 is a drawing showing verification results pertaining to the first cross-sectional shape CS1 of the shared internal electrode layer.

FIG. 6 is a drawing showing verification results pertaining to the second cross-sectional shape CS2 of the shared internal electrode layer.

FIG. 7 is a drawing showing verification results pertaining to the third cross-sectional shape CS3 of the shared internal electrode layer.

DESCRIPTION OF THE SYMBOLS

10—Multilayer ceramic capacitor, 11—Capacitor body, HC—High-capacitance part, LC—Low-capacitance part, 11a1, 11a2—Internal electrode layer, 11a3—Shared internal electrode layer, 11b1—Dielectric layer of high-capacitance part, 11b2—Dielectric layer of low-capacitance part, CP—Curved part of shared internal electrode layer, FP—Flat part of shared internal electrode layer.

DETAILED DESCRIPTION OF EMBODIMENTS

It should be noted that, in the following explanations, the direction in which two opposing faces of the capacitor body 11 mentioned below face each other (corresponding to the left/right direction in FIG. 1, also corresponding to the direction in which the external electrodes 12 mentioned below face each other) is denoted as the "first direction d1," the direction in which other two opposing faces face each other (corresponding to the left/right direction in FIG. 2) is denoted as the "second direction d2," and the direction in which the remaining two opposing faces face each other (corresponding to the up/down direction in FIGS. 1 and 2, also corresponding to the direction in which the internal electrode layers 11a1 to 11a3 mentioned below are stacked) is denoted as the "third direction d3," for the sake of convenience. Also, with respect to each component, the dimension along the first direction d1 is denoted as the "first-direction dimension D1 [symbol of the component]," the dimension along the second direction d2 is denoted as the "second-direction dimension D2 [symbol of the component]," and the dimension along the third direction d3 is denoted as the "third-direction dimension D3 [symbol of the component]." It should be noted that the respective dimensions D1 [symbol of component] to D3 [symbol of component] represent reference dimensions in design and do not include dimensional tolerances in manufacturing.

<<Overall Constitution of Multilayer Ceramic Capacitor 10>>

Figure 1:
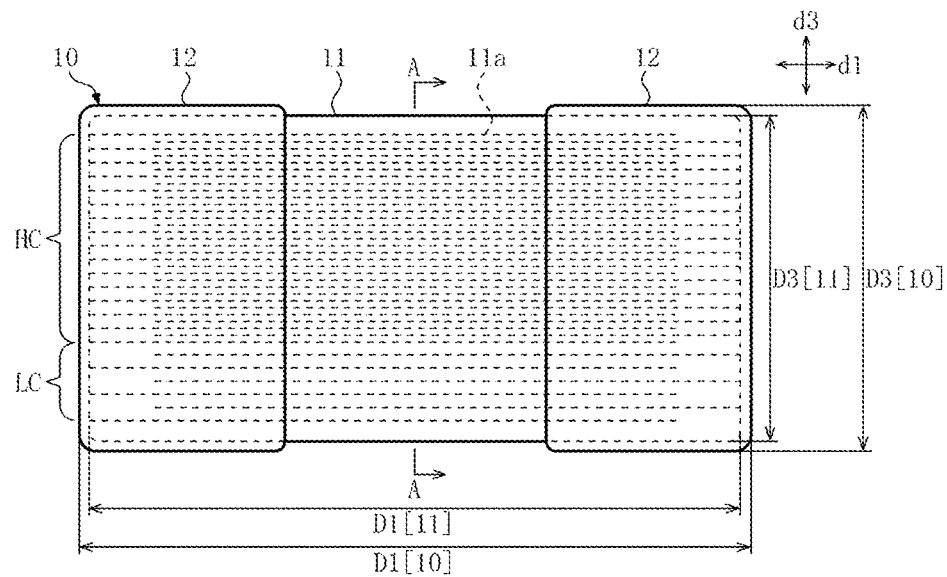
FIG. 1 is a side view of a multilayer ceramic capacitor to which the present invention is applied.
Figure 2:
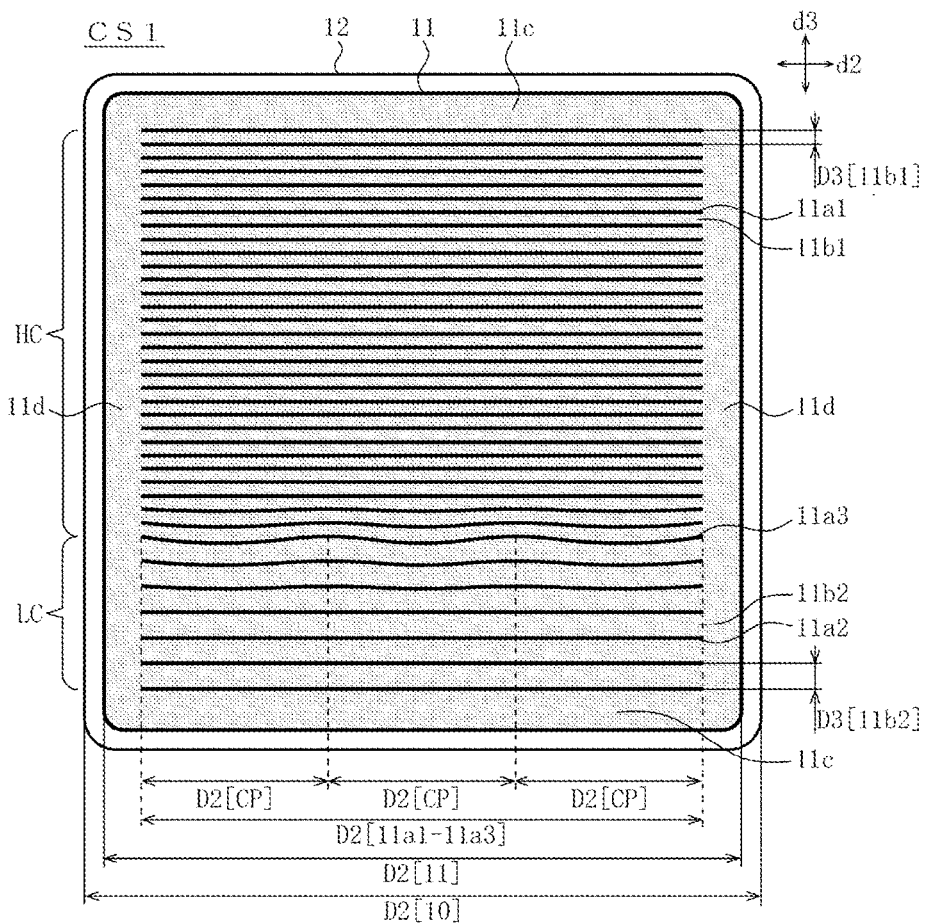
FIG. 2 is an enlarged cross-sectional view of the capacitor body shown in FIG. 1 that has been cut along line A-A, and also a drawing showing a first cross-sectional shape CS1 of the shared internal electrode layer.

First, FIGS. 1 and 2 are used to explain the overall constitution of a multilayer ceramic capacitor 10 to which the present invention is applied.

For reference, the first-direction dimension D1 [10], the second-direction dimension D2 [10], and the third-direction dimension D3 [10], of the sample (multilayer ceramic capacitor 10) on which FIGS. 1 and 2 are based, are 1000 µm, 500 µm, and 500 µm, respectively.

The multilayer ceramic capacitor 10 comprises a capacitor body 11 of roughly rectangular solid shape and a pair of external electrodes 12. The external electrodes 12 are respectively provided at the first direction d1 ends of the capacitor body 11.

The capacitor body 11 houses a capacitance part (not accompanied by symbol) constituted by multiple internal electrode layers (11a1 to 11a3) stacked together in the third direction d3, with dielectric layers (11b1 and 11b2) in between. This capacitance part is halved in the third direction d3, along a shared internal electrode layer 11a3 serving as a boundary, into a high-capacitance part HC and a low-capacitance part LC.

When explained according to FIGS. 1 and 2, the high-capacitance part HC is constituted by 30 internal electrode layers 11a1 and one shared internal electrode layer 11a3 stacked together in the third direction d3, with dielectric layers 11b1 in between. On the other hand, the low-capacitance part LC is constituted by six internal electrode layers 11a2 and one shared internal electrode layer 11a3 stacked together in the third direction d3, with dielectric layers 11b2 in between. Also, the third-direction dimension D3 [11b2] of each of the six dielectric layers 11b2 constituting the low-capacitance part LC is greater than the third-direction dimension D3 [11b1] of each of the 30 dielectric layers 11b1 constituting the high-capacitance part HC.

In other words, the relationship of "Capacitance of the high-capacitance part HC>Capacitance of the low-capacitance part LC" is satisfied by the relationship of "Third-direction dimension D3 [11b1] of each dielectric layer 11b1 constituting the high-capacitance part HC<Third-direction dimension D3 [11b2] of each dielectric layer 11b2 constituting the low-capacitance part LC." The boundary that halves the capacitance part into the high-capacitance part HC and the low-capacitance part LC in the third direction d3 corresponds to the shared internal electrode layer 11a3, as mentioned earlier. Across the boundary of the shared internal electrode layer 11a3, the third-direction dimension D3 [11b2] of each dielectric layer 11b2 constituting the low-capacitance part LC is greater than the third-direction dimension D3 [11b1] of each dielectric layer 11b1 constituting the high-capacitance part HC. For the method of comparing the third-direction dimension D3 [11b2] of each dielectric layer 11b2 and the third-direction dimension D3 [11b1] of each dielectric layer 11b1, a method whereby, in the cross-section shown in FIG. 2, the third-direction dimension D3 [11b2] is measured at 10 different positions on each dielectric layer 11b2 constituting the low-capacitance part LC and the results are averaged, while the third-direction dimension D3 [11b1] is measured at 10 different positions on each dielectric layer 11b1 constituting the high-capacitance part HC and the results are averaged, and then the two averages are compared, can be adopted, for example. In other words, adopting such method allows for accurate determination of the magnitude correlation between the third-direction dimension D3 [11b2] of each dielectric layer 11b2 and the third-direction dimension D3 [11b1] of each dielectric layer 11b1. It should be noted that this comparison method may also be applied when comparing the third-direction dimensions D3 of the respective internal electrode layers 11a1 to 11a3, etc.

Furthermore, the third-direction dimension D3 [11a1] (not illustrated) of each of the 30 internal electrode layers 11a1, the third-direction dimension D3 [11a2] (not illustrated) of each of the six internal electrode layers 11a2, and the third-direction dimension D3 [11a3] (not illustrated) of the one shared internal electrode layer 11a3, are the same, while the corresponding second-direction dimension D2 [11a1], second-direction dimension D2 [11a2] and second-direction dimension D2 [11a3] are also the same, and the corresponding first-direction dimension D1 [11a1] (not illustrated), first-direction dimension D1 [11a2] (not illustrated) and first-direction dimension D1 [11a3] (not illustrated) are also the same.

For reference, the first-direction dimension D1 [11], the second-direction dimension D2 [11] and the third-direction dimension D3 [11], of the capacitor body 11 in the aforementioned sample, are 960 µm, 460 µm, and 460 µm, respectively. Also, the second-direction dimension D2 [11a1] of each internal electrode layer 11a1, the second-direction dimension D2 [11a2] of each internal electrode layer 11a2, and the second-direction dimension D2 [11a3] of the shared internal electrode layer 11a3, in the aforementioned sample, are all 390 µm.

As is evident from FIG. 2, the high-capacitance part HC and the low-capacitance part LC are surrounded by dielectric margin parts 11c on both sides in the third direction d3 and dielectric margin parts 11d on both sides in the second direction d2. Also, as is evident from FIG. 1, the respective internal electrode layers 11a1, the respective internal electrode layers 11a2, and the shared internal electrode layer 11a3, are connected alternately to the base parts mentioned below (not accompanied by symbol) of the pair of external electrodes 12 in the first direction d1.

In other words, the high-capacitance part HC and the low-capacitance part LC are connected in parallel to the pair of external electrodes 12, and the composite capacitance of the high-capacitance part HC and the low-capacitance part LC provides the capacitance of the multilayer ceramic capacitor 10. It should be noted that the capacitance of the high-capacitance part HC can be calculated based on the third-direction dimension D3 [11b1] of each dielectric layer 11b1, and the third-direction dimension D3 [11a1] of each internal electrode layer 11a1, which constitute the high-capacitance part HC, or the like, while the capacitance of the low-capacitance part LC can be calculated based on the third-direction dimension D3 [11b2] of each dielectric layer 11b2, and the third-direction dimension D3 [11a2] of each internal electrode layer 11a2, which constitute the low-capacitance part LC, or the like. In other words, the magnitude correlation between the capacitance of the high-capacitance part HC and the capacitance of the low-capacitance part LC can be estimated from the third-direction dimension D3 [11b1] of each dielectric layer 11b1, and the third-direction dimension D3 [11a1] of each internal electrode layer 11a1, which constitute the high-capacitance part HC, and from the third-direction dimension D3 [11b2] of each dielectric layer 11b2, and the third-direction dimension D3 [11a2] of each internal electrode layer 11a2, which constitute the low-capacitance part LC. Needless to say, the magnitude correlation between the capacitance of the high-capacitance part HC and the capacitance of the low-capacitance part LC can also be understood by removing the external electrodes 12 from the multilayer ceramic capacitor 10, and then forming a tentative electrode that only connects to each internal electrode layer 11a1 constituting the high-capacitance part HC, as well as a tentative electrode that only connects to each internal electrode layer 11a2 constituting the low-capacitance part LC, and measuring the capacitance of the high-capacitance part HC and the capacitance of the low-capacitance part LC separately.

For reference, the third-direction dimension D3 [11c] of each dielectric margin part 11c is 60 µm, while the second-direction dimension D2 [11d] of each dielectric margin part 11d is 35 µm, in the aforementioned sample.

Each external electrode 12 is a five-faced external electrode that continuously has: a base part (not accompanied by symbol) present on one first direction d1 face (left face in FIG. 1) or the other first direction d1 face (right face in FIG. 1) of the capacitor body 11; a first part (not accompanied by symbol) present on one third direction d3 face (bottom face in FIG. 1) of the capacitor body 11; a second part (not accompanied by symbol) present on the other third direction d3 face (top face in FIG. 1) of the capacitor body 11; a third part (not accompanied by symbol) present on one second direction d2 face (left face in FIG. 2) of the capacitor body 11; and a fourth part (not accompanied by symbol) present on the other second direction d2 face (right face in FIG. 2) of the capacitor body 11.

Although not illustrated, each external electrode 12 adopts a two-layer constitution having a base metal film contacting the capacitor body 11 and a surface metal film contacting the outer face thereof, or a multilayer constitution having at least one intermediate metal film between these base metal film and surface metal film.

For reference, the first-direction dimensions (not accompanied by symbol) of the first to fourth parts of each external electrode 12 in the aforementioned sample are all 300 µm (preferably set within a range of one-fifth to two-fifths the first-direction dimension D1 [10]). Also, the first-direction dimension (not accompanied by symbol) of the base part, the third-direction dimensions (not accompanied by symbol) of the first part and second part, and the second-direction dimensions (not accompanied by symbol) of the third part and fourth part, of each external electrode 12 in the aforementioned sample, are all 20 µm (preferably set within a range of 5 to 25 µm).

To provide additional information regarding the material of each component mentioned earlier, the primary component of each internal electrode layer 11a1, each internal electrode layer 11a2, and the shared internal electrode layer 11a3, of the capacitor body 11, is preferably a metal selected from nickel, copper, palladium, platinum, silver, gold, and alloys thereof. Also, the primary component of each dielectric layer 11b1, each dielectric layer 11b2, each dielectric margin part 11c, and each dielectric margin part 11d, of the capacitor body 11, is preferably a dielectric ceramic selected from barium titanate, strontium titanate, calcium titanate, magnesium titanate, calcium zirconate, calcium zirconate titanate, barium zirconate, titanium oxide, etc. It should be noted that, although each dielectric layer 11b1, each dielectric layer 11b2 and each dielectric margin part 11d have the same primary component when a general stacking manufacturing method is used, this same primary component may be different from the primary component of each dielectric margin part 11c.

Furthermore, when each external electrode 12 has a two-layer constitution or multilayer constitution, the primary component of the base metal film is preferably a metal selected from nickel, copper, palladium, platinum, silver, gold, and alloys thereof, while the primary component of the surface metal film is preferably a metal selected from copper, tin, palladium, gold, zinc, and alloys thereof, and the primary component of the intermediate metal film is preferably a metal selected from platinum, palladium, gold, copper, nickel, and alloys thereof. It should be noted that the base metal film may be either a baked metal film or plated metal film, while the surface metal film is preferably constituted by a plated metal film, and the intermediate metal film is preferably constituted by a plated metal film.

<<Cross-Sectional Shape of Shared Internal Electrode Layer 11a3>>

Figure 3:
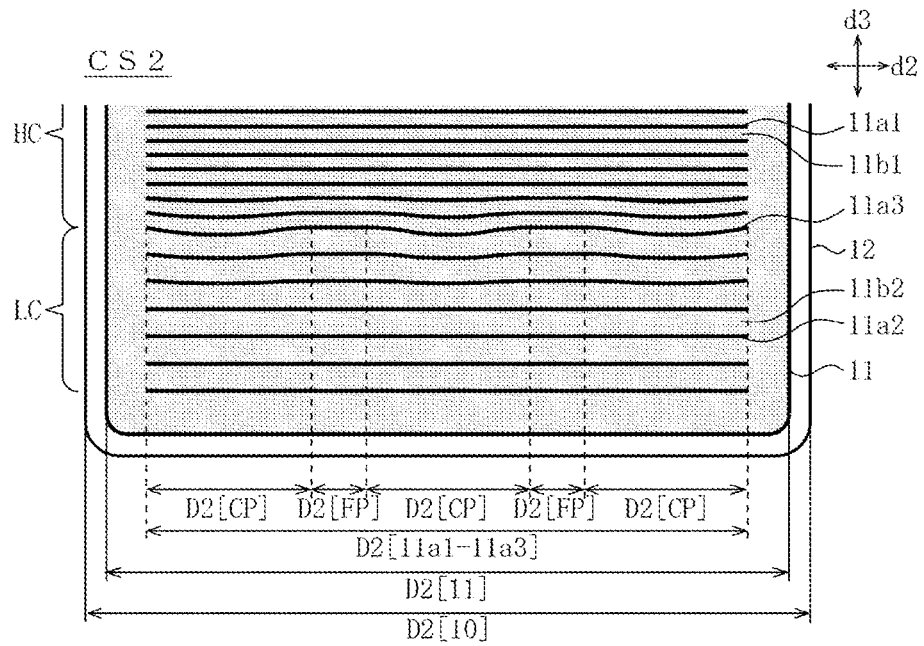
FIG. 3 is a partial cross-sectional view corresponding to FIG. 2, showing a second cross-sectional shape CS2 of the shared internal electrode layer.
Figure 4:
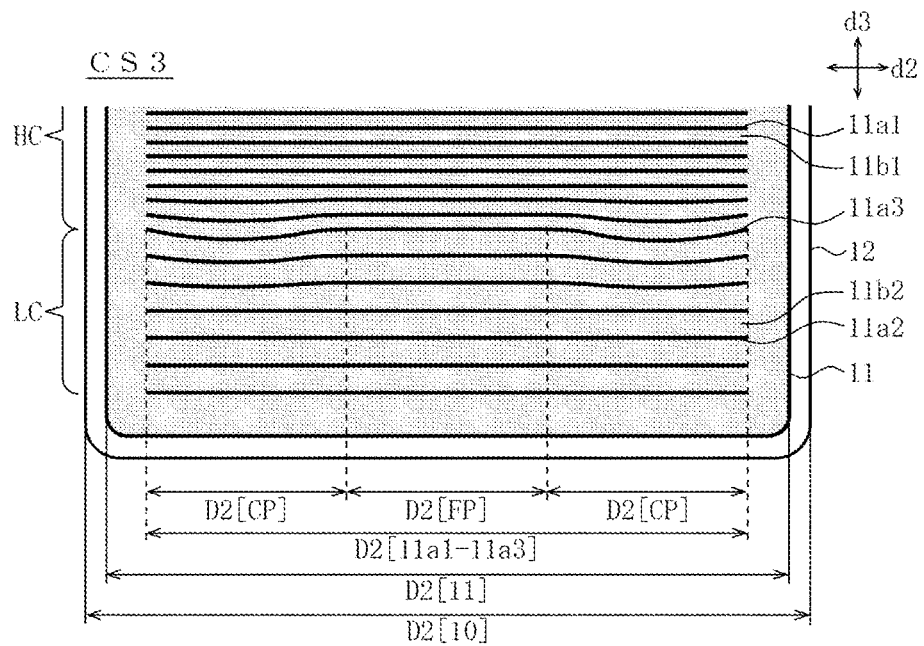
FIG. 4 is a partial cross-sectional view corresponding to FIG. 2, showing a third cross-sectional shape CS3 of the shared internal electrode layer.

Next, FIGS. 2 to 4 are used to explain the cross-sectional shape of the shared internal electrode layer 11a3 as revealed when the capacitor body 11 is cut along a surface running in parallel with line A-A shown in FIG. 1, or specifically a surface crossing at right angles with the first direction d1.

It should be noted that the curved part CP mentioned below indicates a part of the shared internal electrode layer 11a3 that projects toward the dielectric layer on the low-capacitance part LC side adjoining the shared internal electrode layer 11a3, which is not limited to a part having a clean arched or arced cross-sectional shape, but includes a part with slight distortion whose cross-sectional shape is still deemed to approximate an arch or arc. Also, the second-direction dimension D2 [CP] of the curved part CP mentioned below indicates the second direction d2 dimension, with reference to the bottom face of a non-projecting location of the shared internal electrode layer 11a3 shown in FIGS. 2 to 4, of the projecting location on the bottom face side. Additionally, the third-direction dimension D3 [CP] (not illustrated) of the curved part CP mentioned below indicates the maximum third direction d3 dimension, with reference to the bottom face of a non-projecting location of the shared internal electrode layer 11a3 shown in FIGS. 2 to 4, of the projecting location on the bottom face side. Furthermore, the flat part FP mentioned below indicates a part of the shared internal electrode layer 11a3 that does not project toward the dielectric layer on low-capacitance part LC side adjoining the shared internal electrode layer 11a3, which is not limited to a part having a clean straight cross-sectional shape, but includes a part with slight concavity and convexity whose cross-sectional shape is still deemed to approximate a straight line.

<First Cross-Sectional Shape CS1 (Refer to FIG. 2)>

The first cross-sectional shape CS1 of the shared internal electrode layer 11a3 shown in FIG. 2 is such that a curved part CP projecting toward the dielectric layer 11b2 on the low-capacitance part LC side adjoining the shared internal electrode layer 11a3 is present on both sides in the second direction d2 and also in between. To be specific, the cross-sectional shape has three curved parts CP present side by side in the second direction d2. Although the three curved parts CP shown in FIG. 2 have the same second-direction dimension D2 [CP] and third-direction dimension D3 [CP] (not accompanied by symbol), the three curved parts CP need not always have the same second-direction dimension D2 [CP], or specifically, the second-direction dimension D2 [CP] of one or two of the three curved parts CP may be different from the second-direction dimension D2 [CP] of the remaining curved part(s) CP. Also, the three curved parts CP need not always have the same third-direction dimension D3 [CP], or specifically, the third-direction dimension D3 [CP] of one or two of the three curved parts CP may be different from the third-direction dimension D3 [CP] of the remaining curved part(s) CP.

<Second Cross-Sectional Shape CS2 (Refer to FIG. 3)>

The second cross-sectional shape CS2 of the shared internal electrode layer 11a3 shown in FIG. 3 is such that a curved part CP projecting toward the dielectric layer 11b2 on the low-capacitance part LC side adjoining the shared internal electrode layer 11a3 is present on both sides in the second direction d2 and also in between, and a flat part FP (non-curved part) is present between each pair of the curved parts CP adjoining one another in the second direction d2. To be specific, the cross-sectional shape has three curved parts CP present side by side in the second direction d2, with flat parts FP in between. Although the three curved parts CP shown in FIG. 3 have the same second-direction dimension D2 [CP] and third-direction dimension D3 [CP] (not accompanied by symbol), the three curved parts CP need not always have the same second-direction dimension D2 [CP], or specifically, the second-direction dimension D2 [CP] of one or two of the three curved parts CP may be different from the second-direction dimension D2 [CP] of the remaining curved part(s) CP. Also, the three curved parts CP need not always have the same third-direction dimension D3 [CP], or specifically, the third-direction dimension D3 [CP] of one or two of the three curved parts CP may be different from the third-direction dimension D3 [CP] of the remaining curved part(s) CP.

<Third Cross-Sectional Shape CS3 (Refer to FIG. 4)>

The third cross-sectional shape CS3 of the shared internal electrode layer 11a3 shown in FIG. 4 is such that a curved part CP projecting toward the dielectric layer 11b2 on the low-capacitance part LC side adjoining the shared internal electrode layer 11a3 is present on both sides in the second direction d2, and a flat part FP (non-curved part) is present between the curved parts CP adjoining each other in the second direction d2. To be specific, the cross-sectional shape has two curved parts CP present side by side in the second direction d2, with a flat part FP in between. Although the two curved parts CP shown in FIG. 4 have the same second-direction dimension D2 [CP] and third-direction dimension D3 [CP] (not accompanied by symbol), the two curved parts CP need not always have the same second-direction dimension D2 [CP], or specifically, the second-direction dimension D2 [CP] of one of the two curved parts CP may be different from the second-direction dimension D2 [CP] of the remaining curved part CP. Also, the two curved parts CP need not always have the same third-direction dimension D3 [CP], or specifically, the third-direction dimension D3 [CP] of one of the two curved parts CP may be different from the third-direction dimension D3 [CP] of the remaining curved part CP.

<<Verification of Whether or not Object can be Achieved Based on Cross-Sectional Shapes CS1 to CS3>>

Next, FIGS. 5 to 7 are used to explain whether or not the object can be achieved, or specifically whether or not residual separation is being suppressed, based on the first cross-sectional shape CS1, second cross-sectional shape CS2 and third cross-sectional shape CS3 of the shared internal electrode layer 11a3 shown in FIGS. 2 to 4.

<Explanation of FIGS. 5 to 7>

In FIG. 5, Sample 01 represents a sample provided for comparison, while Samples 02 to 12 represent samples corresponding to the first cross-sectional shape CS1 of the shared internal electrode layer 11a3 shown in FIG. 2. Also, in FIG. 5, "D2 [CP]" and "D3 [CP]" at the far left correspond to the second-direction dimension D2 [CP] and the third-direction dimension D3 [CP] of the left curved part CP shown in FIG. 2, respectively; "D2 [CP]" and "D3 [CP]" on their right correspond to the second-direction dimension D2 [CP] and the third-direction dimension D3 [CP] of the center curved part CP shown in FIG. 2, respectively; and "D2 [CP]" and "D3 [CP]" on their right correspond to the second-direction dimension D2 [CP] and the third-direction dimension D3 [CP] of the right curved part CP shown in FIG. 2, respectively.

In FIG. 6, Sample 13 represents a sample provided for comparison, while Samples 14 to 24 represent samples corresponding to the second cross-sectional shape CS2 of the shared internal electrode layer 11a3 shown in FIG. 3. Also, in FIG. 6, "D2 [CP]" and "D3 [CP]" at the far left correspond to the second-direction dimension D2 [CP] and the third-direction dimension D3 [CP] of the left curved part CP shown in FIG. 3, respectively; "D2 [FP]" on their right corresponds to the second-direction dimension D2 [FP] of the left flat part FP shown in FIG. 3; "D2 [CP]" and "D3 [CP]" on its right correspond to the second-direction dimension D2 [CP] and the third-direction dimension D3 [CP] of the center curved part CP shown in FIG. 3, respectively; "D2 [FP]" on their right corresponds to the second-direction dimension D2 [FP] of the right flat part FP shown in FIG. 3; and "D2 [CP]" and "D3 [CP]" on its right correspond to the second-direction dimension D2 [CP] and the third-direction dimension D3 [CP] of the right curved part CP shown in FIG. 3, respectively.

In FIG. 7, Sample 25 represents a sample provided for comparison, while Samples 26 to 36 represent samples corresponding to the third cross-sectional shape CS3 of the shared internal electrode layer 11a3 shown in FIG. 4. Also, in FIG. 7, "D2 [CP]" and "D3 [CP]" at the far left correspond to the second-direction dimension D2 [CP] and the third-direction dimension D3 [CP] of the left curved part CP shown in FIG. 4, respectively; "D2 [FP]" on their right corresponds to the second-direction dimension D2 [FP] of the flat part FP shown in FIG. 4; and "D2 [CP]" and "D3 [CP]" on its right correspond to the second-direction dimension D2 [CP] and the third-direction dimension D3 [CP] of the right curved part CP shown in FIG. 4, respectively.

Sample 01 in FIG. 5, Sample 13 in FIG. 6, and Sample 25 in FIG. 7, are the same, but this same sample is listed separately at the beginning of each table under a different sample number in order to facilitate comparison against Samples 02 to 12, 14 to 24, and 26 to 36, corresponding to the cross-sectional shapes CS1, CS2, and CS3, respectively.

<Explanation of Sample Production Method and Specifications>

To produce Samples 02 to 12, 14 to 24, and 26 to 36, corresponding to the cross-sectional shapes CS1, CS2, and CS3, respectively, first of all a first green sheet whose primary component is barium titanate and whose thickness varies, a second green sheet whose primary component is barium titanate and whose thickness is greater than that of the first green sheet, a third green sheet which is a first green sheet on the surface of which internal electrode layer patterns whose primary component is nickel are formed, and a fourth green sheet which is a second green sheet on the surface of which internal electrode layer patterns whose primary component is nickel are formed, are prepared.

Next, a specified number of unit sheets taken from the first green sheet or second green sheet are stacked and thermally compressed one by one, to form an area corresponding to one dielectric margin part 11c, while a specified number of unit sheets (including internal electrode layer patterns) taken from the fourth green sheet are stacked and thermally compressed one by one, to form an area corresponding to the low-capacitance part LC.

Next, a shaping plate is pressed onto the top internal electrode layer patterns (internal electrode layer patterns that will become the shared internal electrode layer 11a3) to depress parts of each internal electrode layer pattern, in order to form, along each internal electrode layer pattern, locations corresponding to curved parts CP. Provided on the pressuring surface of the shaping plate are fine convexes having an arched or arced cross-sectional shape.

Next, a specified number of unit sheets taken from the third green sheet (including internal electrode layer patterns) are stacked and thermally compressed one by one, to form an area corresponding to the high-capacitance part HC, while a specified number of unit sheets taken from the first green sheet or second green sheet are stacked and thermally compressed one by one, to form an area corresponding to the other dielectric margin part 11c.

Next, the entire stack of sheets is thermally compressed to produce an unsintered sheet laminate that permits multi-piece forming. Next, the unsintered sheet laminate that permits multi-piece forming is cut into a grid, to produce unsintered capacitor bodies 11. Next the unsintered capacitor bodies 11 are introduced into a sintering furnace and sintered (including binder removal and sintering) all at once in a reducing ambience based on a temperature profile appropriate for barium titanium and nickel.

This way, capacitor bodies 11 for Samples 02 to 12, 14 to 24, and 26 to 36, corresponding to the cross-sectional shapes CS1, CS2, and CS3, respectively, are produced. The method for producing Samples 01, 13 and 25 provided for comparison, is the same as the aforementioned method, except that the step to press a shaping plate onto the top internal electrode layer patterns (internal electrode layer patterns that will become the shared internal electrode layer 11a3) is eliminated following the stacking and thermal compression of unit sheets (including internal electrode layer patterns) taken from the fourth green sheet.

It should be noted that, in FIGS. 2 to 4, multiple internal electrode layers 11a1, 11a2 positioned close to each shared internal electrode layer 11a3 in the third direction d3 have a cross-sectional shape similar to the cross-sectional shape of each shared internal electrode layer 11a3, for the following reasons:

When a shaping plate is pressed onto the top internal electrode layer patterns (internal electrode layer patterns that will become the shared internal electrode layer 11a3) following the stacking and thermal compression of unit sheets (including internal electrode layer patterns) taken from the fourth green sheet, similar partial projections (depressions) are also formed in the internal electrode layer patterns below them.

When unit sheets (including internal electrode patterns) taken from the third green sheet are stacked and thermally compressed following the pressing of a shaping plate, similar partial projections (depressions) are also formed in the internal electrode layer patterns above the top internal electrode layer patterns (internal electrode layer patterns that will become the shared internal electrode layer 11a3).

The specifications (excluding the specifications of curved parts of the shared internal electrode layer) of Samples 02 to 12, 14 to 24, and 26 to 36, corresponding to the cross-sectional shapes CS1, CS2, and CS3, respectively, are explained as follows, for the capacitor body 11 shown in FIGS. 1 and 2:

The first-direction dimension D1 [11], second-direction dimension D2 [11], and third-direction dimension D3 [11], of the capacitor body 11, are 960 μm, 460 μm, and 460 μm, respectively.

The second-direction dimension D2 [11a1] of each internal electrode layer 11a1, the second-direction dimension D2 [11a2] of each internal electrode layer 11a2, and the second-direction dimension D2 [11a3] of the shared internal electrode layer 11a3, are all 390 μm.

The third-direction dimension D3 [11a1] of each internal electrode layer 11a1, the third-direction dimension D3 [11a2] of each internal electrode layer 11a2, and the third-direction dimension D3 [11a3] of the shared internal electrode layer 11a3, are all 1 μm.

The third-direction dimension D3 [11b1] of each dielectric layer 11b1 is 1.5 μm, while the third-direction dimension D3 [11b2] of each dielectric layer 11b2 is 6 μm.

The third-direction dimension D3 [11c] of each dielectric margin part 11c is 60 μm, while the second-direction dimension D2 [11d] of each dielectric margin part 11d is 35 µm, and the same specifications apply to Samples 01, 11, and 21 provided for comparison.

<Explanation of Verification Method>

Samples 02 to 12, 14 to 24, and 26 to 36, corresponding to the cross-sectional shapes CS1, CS2, and CS3, respectively, were cut along a surface running in parallel with line A-A shown in FIG. 1, or specifically a surface crossing at right angles with the first direction d1, after which the cut faces were ground and observed with a scanning electron microscope to see if there was a separation between the shared internal electrode layer 11a3 and the dielectric layer 11b2 on the low-capacitance part LC side adjoining this shared internal electrode layer 11a3. Presence of a separation was recognized if a continuous breakaway over at least 5 µm was observed, in the second direction d2, between the shared internal electrode layer 11a3 and the dielectric layer 11b2 on the low-capacitance part LC side adjoining this shared internal electrode layer 11a3. Also, Samples 01, 11, and 21 provided for comparison were also checked for presence or absence of a separation according to the same method. In the "Separation" column at the far right in FIGS. 5 to 7, out of 10 pieces of each sample, the number confirmed to have a separation is indicated by n/10.

<Verification Results of First Cross-Sectional Shape CS1 (Refer to FIG. 5)>

Samples 02 to 08 feature three curved parts CP whose second-direction dimension D2 [CP] is 130 µm, with the third-direction dimension D3 [CP] of each curved part CP gradually increased from 1 to 15 µm. Sample 09 features three curved parts CP whose second-direction dimension D2 [CP] is 130 µm, with the third-direction dimension D3 [CP] of the left and right curved parts CP adjusted to 15 µm, and the third-direction dimension D3 [CP] of the center curved part CP adjusted to 10 µm. Sample 10 features three curved parts CP whose second-direction dimension D2 [CP] is 130 µm, with the third-direction dimension D3 [CP] of the left and right curved parts CP adjusted to 2 µm, and the third-direction dimension D3 [CP] of the center curved part CP adjusted to 1 µm. With Sample 11, the second-direction dimension D2 [CP] of the left and right curved parts CP is 160 µm, the second-direction dimension D2 [CP] of the center curved part CP is 70 µm, the third-direction dimension D3 [CP] of the left curved part CP is 6 µm, the third-direction dimension D3 [CP] of the center curved part is 4 µm, and the third-direction dimension D3 [CP] of the right curved part CP is 8 µm. With Sample 12, the second-direction dimension D2 [CP] of the left curved part CP is 70 µm, the second-direction dimension D2 [CP] of the center curved part CP is 170 µm, the second-direction dimension D2 [CP] of the right curved part CP is 150 µm, and the third-direction dimension D3 [CP] of the three curved parts CP is 1 µm.

With Samples 02 to 12, the number of piece(s) that was/were confirmed to have a separation was extremely small compared to Sample 01 provided for comparison. In other words, the object (suppression of residual separation) was dependably achieved by all of Samples 02 to 12 corresponding to the first cross-sectional shape CS1 of the shared internal electrode layer 11a3 shown in FIG. 2.

Also, among Samples 02 to 08, a separation was present in Samples 02 and 03, but no separation was present in Samples 04 to 08. This is because, in Samples 04 to 08, the third-direction dimension D3 [CP] of each curved part CP is greater than the third-direction dimension D3 [CP] of each curved part CP in either Sample 02 or 03, and the resulting increase in contact area probably made an occurrence of separation difficult. Furthermore, comparison of the "Separation" results of Samples 03 and 10 indicates that making the third-direction dimension D3 [CP] of the center curved part CP smaller than the third-direction dimension D3 [CP] of the left and right curved parts CP is probably desirable in suppressing occurrence of separation. Furthermore, setting the third-direction dimension D3 [CP] of each curved part CP to a range of 4 to 15 µm, or in other words, setting the third-direction dimension D3 [CP] of each curved part CP to a range of 66 to 250% of the third-direction dimension D3 [11b2] of each dielectric layer 11b2, is probably desirable.

Furthermore, the "Separation" results of Samples 09 to 12 indicate that probably residual separation can still be suppressed even when the three curved parts CP do not have the same third-direction dimension D3 [CP], and that probably residual separation can be suppressed even when the three curved parts CP do not have the same second-direction dimension D2 [CP].

<Verification Results of Second Cross-Sectional Shape CS2 (Refer to FIG. 6)>

Samples 14 to 20 feature three curved parts CP whose second-direction dimension D2 [CP] is 90 µm, with the second-direction dimension D2 [FP] of two flat parts FP adjusted to 60 µm, and the third-direction dimension D3 [CP] of each curved part CP gradually increased from 1 to 15 µm. Sample 21 features three curved parts CP whose second-direction dimension D2 [CP] is 90 µm, with the second-direction dimension D2 [FP] of two flat parts FP adjusted to 60 µm, the third-direction dimension D3 [CP] of the left and right curved parts CP adjusted to 15 µm, and the third-direction dimension D3 [CP] of the center curved part CP adjusted to 10 µm. Sample 22 features three curved parts CP whose second-direction dimension D2 [CP] is 90 µm, with the second-direction dimension D2 [FP] of two flat parts FP adjusted to 60 µm, the third-direction dimension D3 [CP] of the left and right curved parts CP adjusted to 2 µm, and the third-direction dimension D3 [CP] of the center curved part CP adjusted to 1 µm. With Sample 23, the second-direction dimension D2 [CP] of the left and right curved parts CP is 110 µm, the second-direction dimension D2 [CP] of the center curved part CP is 50 µm, the second-direction dimension D2 [FP] of the two flat parts FP is 60 µm, the third-direction dimension D3 [CP] of the left curved part CP is 6 µm, the third-direction dimension D3 [CP] of the center curved part CP is 4 µm, and the third-direction dimension D3 [CP] of the right curved part CP is 11 µm. With Sample 24, the second-direction dimension D2 [CP] of the left curved part CP is 30 µm, the second-direction dimension D2 [CP] of the center curved part CP is 130 µm, the second-direction dimension D2 [CP] of the right curved part CP is 70 µm, the second-direction dimension D2 [FP] of the two flat parts FP is 80 µm, and the third-direction dimension D3 [CP] of the three curved parts is 1 µm.

With Samples 14 to 24, the number of piece(s) that was/were confirmed to have a separation was extremely small compared to Sample 13 provided for comparison. In other words, the object (suppression of residual separation) was dependably achieved by all of Samples 14 to 24 corresponding to the second cross-sectional shape CS2 of the shared internal electrode layer 11a3 shown in FIG. 3.

Also, among Samples 14 to 20, a separation was present in Samples 14 and 15, but no separation was present in Samples 16 to 20. Fewer pieces of Samples 16 to 20 separated compared to Samples 14 and 15. This is because, in Samples 16 to 20, the third-direction dimension D3 [CP] of each curved part CP is greater than the third-direction dimension D3 [CP] of each curved part CP in either Sample 14 or 15, and the resulting increase in contact area probably made an occurrence of separation difficult. Furthermore, comparison of the "Separation" results of Samples 15 and 22 indicates that making the third-direction dimension D3 [CP] of the center curved part CP smaller than the third-direction dimension D3 [CP] of the left and right curved parts CP is probably desirable in suppressing occurrence of separation. Furthermore, setting the third-direction dimension D3 [CP] of each curved part CP to a range of 4 to 15 μm, or in other words, setting the third-direction dimension D3 [CP] of each curved part CP to a range of 66 to 250% of the third-direction dimension D3 [11$b$2] of each dielectric layer 11$b$2, is probably desirable.

Furthermore, the "Separation" results of Samples 21 to 24 indicate that probably residual separation can still be suppressed even when the three curved parts CP do not have the same third-direction dimension D3 [CP], and that probably residual separation can be suppressed even when the three curved parts CP do not have the same second-direction dimension D2 [CP].

<Verification Results of Third Cross-Sectional Shape CS3 (Refer to FIG. 7)>

Samples 24 to 32 feature two curved parts CP whose second-direction dimension D2 [CP] is 130 μm, with the second-direction dimension D2 [FP] of one flat part FP adjusted to 130 μm, and the third-direction dimension D3 [CP] of each curved part CP gradually increased from 1 to 15 μm. Sample 33 features two curved parts CP whose second-direction dimension D2 [CP] is 130 μm, with the second-direction dimension D2 [FP] of one flat part FP adjusted to 130 μm, the third-direction dimension D3 [CP] of the left curved part CP adjusted to 15 μm, and the third-direction dimension D3 [CP] of the right curved part CP adjusted to 10 μm. Sample 34 features two curved parts CP whose second-direction dimension D2 [CP] is 130 μm, with the second-direction dimension D2 [FP] of one flat part FP adjusted to 130 μm, the third-direction dimension D3 [CP] of the left curved part CP adjusted to 1 μm, and the third-direction dimension D3 [CP] of the right curved part CP adjusted to 1.5 μm. With Sample 35, the second-direction dimension D2 [CP] of two curved parts CP is 160 μm, the second-direction dimension D2 [FP] of one flat part FP is 70 μm, and the third-direction dimension D3 [CP] of the two curved parts CP is 1 μm. With Sample 36, the second-direction dimension D2 [CP] of the left curved part CP is 100 μm, the second-direction dimension D2 [CP] of the right curved part CP is 90 μm, the second-direction dimension D2 [FP] of one flat part FP is 200 μm, and the third-direction dimension D3 [CP] of the two curved parts CP is 1

With Samples 26 to 36, the number of piece(s) that was/were confirmed to have a separation was extremely small compared to Sample 25 provided for comparison. In other words, the object (suppression of residual separation) was dependably achieved by all of Samples 26 to 36 corresponding to the third cross-sectional shape CS3 of the shared internal electrode layer 11$a$3 shown in FIG. 4.

Also, among Samples 26 to 32, fewer pieces of Samples 28 to 32 separated compared to Samples 26 and 27. This is because, in Samples 28 to 32, the third-direction dimension D3 [CP] of each curved part CP is greater than the third-direction dimension D3 [CP] of each curved part CP in either Sample 26 or 27, and the resulting increase in contact area probably made an occurrence of separation difficult. Furthermore, setting the third-direction dimension D3 [CP] of each curved part CP to a range of 4 to 15 μm, or in other words, setting the third-direction dimension D3 [CP] of each curved part CP to a range of 66 to 250% of the third-direction dimension D3 [11$b$2] of each dielectric layer 11$b$2, is probably desirable.

Furthermore, the "Separation" results of Samples 33 to 36 indicate that probably residual separation can still be suppressed even when the two curved parts CP do not have the same third-direction dimension D3 [CP], and that probably residual separation can be suppressed even when the two curved parts CP do not have the same second-direction dimension D2 [CP].

<Supplement>

The verification results based on Samples 02 to 12, 14 to 24, and 26 to 36, corresponding to the cross-sectional shapes CS1, CS2, and CS3, respectively, were presented above; moreover, the following conclusions can also be drawn in light of these verification results:

(1) Separation can effectively be suppressed by setting a large third-direction dimension D3 [CP], in the third direction d3, for the curved part CP of the shared internal electrode layer 11$a$3.

(2) Separation can effectively be suppressed by setting the shared internal electrode layer 11$a$3 to have three curved parts CP instead of two.

(3) If the shared internal electrode layer 11$a$3 has three curved parts CP, separation can effectively be suppressed by setting the third-direction dimension D3 [CP] of the center curved part CP smaller than the third-direction dimension D3 [CP] of the left and right curved parts CP.

VARIATION EXAMPLES

Next, variation examples of the aforementioned multilayer ceramic capacitor 10 are explained.

<M1> While the multilayer ceramic capacitor 10 described above has the relationship of "First-direction dimension D1 [10]>Second-direction dimension D2 [10] =Third-direction dimension D3 [10]," effects similar to those described above can still be achieved with a multilayer ceramic capacitor having the relationship of "First-direction dimension D1 [10]>Second-direction dimension D2 [10] >Third-direction dimension D3 [10]," the relationship of "First-direction dimension D1 [10]>Third-direction dimension D3 [10]>Second-direction dimension D2 [10]," the relationship of "Second-direction dimension D2 [10]>First-direction dimension D1 [10]=Third-direction dimension D3 [10]," the relationship of "Second-direction dimension D2 [10]>First-direction dimension D1 [10]>Third-direction dimension D3 [10]," or the relationship of "Second-direction dimension D2 [10]>Third-direction dimension D3 [10] >First-direction dimension D1 [10]."

<M2> While the multilayer ceramic capacitor 10 described above has 30 internal electrode layers 11$a$1 and six internal electrode layers 11$a$2, effects similar to those described above can still be achieved so long as the relationship where the third-direction dimension D3 [11$b$2] of each dielectric layer 11$b$2 constituting the low-capacitance part LC is greater than the third-direction dimension D3 [11$b$1] of each dielectric layer 11$b$1 constituting the high-capacitance part HC, is satisfied.

<M3> While each external electrode 12 of the multilayer ceramic capacitor 10 described above is a five-faced external electrode, effects similar to those described above can still be achieved when it is: a three-faced external electrode that continuously has: a base part (not accompanied by symbol) present on one first direction d1 face (left face in FIG. 1) or the other first direction d1 face (right face in FIG. 1) of the capacitor body 11; a first part (not accompanied by symbol)

present on one third direction d3 face (bottom face in FIG. 1) of the capacitor body 11; and a second part (not accompanied by symbol) present on the other third direction d3 face (top face in FIG. 1) of the capacitor body 11; or a two-faced external electrode that continuously has: a base part (not accompanied by symbol) present on one first direction d1 face (left face in FIG. 1) or the other first direction d1 face (right face in FIG. 1) of the capacitor body 11; and a first part (not accompanied by symbol) present on one third direction d3 face (bottom face in FIG. 1) of the capacitor body 11.

<M4> While the third-direction dimension D3 [11b1] of each dielectric layer 11b1 constituting the high-capacitance part HC is 1.5 μm in the aforementioned example, this third-direction dimension D3 [11b1] can be set in any way as deemed appropriate within a range of 0.3 to 1.8 μm. This range may be 0.3 to 0.8 μm, or 0.3 to 0.6 μm. In other words, a multilayer ceramic capacitor having a smaller size and higher capacitance can be realized by reducing the third-direction dimension D3 [11b1] of each dielectric layer 11b1 constituting the high-capacitance part HC.

<M5> The specifications (excluding the specifications of curved parts of the shared internal electrode layer) of Samples 02 to 12, 14 to 24, and 26 to 36, corresponding to the cross-sectional shapes CS1, CS2, and CS3, respectively, or in other words, the specifications of the capacitor body 11, are provided as examples to verify whether or not the object (suppression of residual separation) can be achieved. To be specific, effects similar to those described above can still be achieved when the following are changed to different values:

First-direction dimension D1 [11], second-direction dimension D2 [11], and third-direction dimension D3 [11], of the capacitor body 11

Second-direction dimension D2 [11a1] of each internal electrode layer 11a1, second-direction dimension D2 [11a2] of each internal electrode layer 11a2, and second-direction dimension D2 [11a3] of the shared internal electrode layer 11a3

Third-direction dimension D3 [11a1] of each internal electrode layer 11a1, third-direction dimension D3 [11a2] of each internal electrode layer 11a2, and third-direction dimension D3 [11a3] of the shared internal electrode layer 11a3

Third-direction dimension D3 [11b1] of each dielectric layer 11b1, and third-direction dimension D3 [11b2] of each dielectric layer 11b2

Third-direction dimension D3 [11c] of each dielectric margin part 11c, and second-direction dimension D2 [11d] of the dielectric margin parts 11d on both sides in the second direction d2

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, "a" may refer to a species or a genus including multiple species, and "the invention" or "the present invention" may refer to at least one of the embodiments or aspects explicitly, necessarily, or inherently disclosed herein. The terms "constituted by" and "having" refer independently to "typically or broadly comprising", "comprising", "consisting essentially of", or "consisting of" in some embodiments. In this disclosure, any defined meanings do not necessarily exclude ordinary and customary meanings in some embodiments.

The present application claims priority to Japanese Patent Application No. 2017-123910, filed Jun. 26, 2017, the disclosure of which is incorporated herein by reference in its entirety including any and all particular combinations of the features disclosed therein.

It will be understood by those of skill in the art that numerous and various modifications can be made without departing from the spirit of the present invention. Therefore, it should be clearly understood that the forms of the present invention are illustrative only and are not intended to limit the scope of the present invention.

I claim:

1. A multilayer ceramic capacitor comprising: a capacitor body of roughly rectangular solid shape that has a capacitance part constituted by multiple internal electrode layers stacked together with dielectric layers in between; and a pair of external electrodes to which the multiple internal electrode layers are connected alternately;

wherein a first direction in which two opposing faces of the capacitor body face each other is a direction in which the external electrodes face each other, a third direction in which other two opposing faces of the capacitor body face each other is a direction in which the internal electrode layers are stacked, and a second direction is a direction in which the remaining two opposing faces of the capacitor body face each other, and dimensions along the respective directions are defined as a first-direction dimension, a third-direction dimension, and a second-direction dimension, respectively, wherein the capacitance part is divided in the third direction, along a shared internal electrode layer serving as a boundary, into a high-capacitance part and a low-capacitance part, where a relationship of "Capacitance of the high-capacitance part>Capacitance of the low-capacitance part" is satisfied; and wherein as viewed from a cross section of the capacitor body taken along a plane perpendicular to the first direction where the internal electrode layers connected to the respective external electrodes overlap as viewed in the third direction, a cross-sectional shape of the shared internal electrode layer has a curved part that projects into a dielectric layer adjoining the shared internal electrode layer on the low-capacitance part side, in at least two locations of the shared internal electrode.

2. The multilayer ceramic capacitor according to claim 1, wherein the cross-sectional shape of the shared internal electrode layer has the curved part at least on both sides of the shared internal electrode layer in the second direction.

3. The multilayer ceramic capacitor according to claim 1, wherein the cross-sectional shape of the shared internal electrode layer is such that the curved part is present on both sides of the shared internal electrode layer in the second direction, and also in between.

4. The multilayer ceramic capacitor according to claim 3, wherein the cross-sectional shape of the shared internal electrode layer is such that three of the curved parts are arranged side by side in the second direction.

5. The multilayer ceramic capacitor according to claim 3, wherein the cross-sectional shape of the shared internal electrode layer is such that three of the curved parts are arranged side by side in the second direction, with flat parts in between.

6. The multilayer ceramic capacitor according to claim 1, wherein the cross-sectional shape of the shared internal electrode layer is such that the curved part is present on both sides of the shared internal electrode layer in the second direction.

7. The multilayer ceramic capacitor according to claim 6, wherein the cross-sectional shape of the shared internal electrode layer is such that two of the curved parts are arranged side by side in the second direction, with a flat part in between.

8. The multilayer ceramic capacitor according to claim 1, wherein the third-direction dimension of each of the dielectric layers constituting the high-capacitance part is set in a range of 0.3 to 1.8 µm.

9. The multilayer ceramic capacitor according to claim 1, wherein the third-direction dimension of each of the dielectric layers constituting the high-capacitance part is set in a range of 0.3 to 0.8 µm.

10. The multilayer ceramic capacitor according to claim 1, wherein the third-direction dimension of each of the dielectric layers constituting the high-capacitance part is set in a range of 0.3 to 0.6 µm.

\* \* \* \* \*